United States Patent [19]

Kanazawa

[11] Patent Number: 4,758,938
[45] Date of Patent: Jul. 19, 1988

[54] PWM INVERTER CONTROLLER FOR STARTING AND DRIVING AN AC MOTOR

[75] Inventor: Hidetoshi Kanazawa, Fujinomiya, Japan

[73] Assignee: Kabushiki Kaisha Toshiba, Kawasaki, Japan

[21] Appl. No.: 10,337

[22] Filed: Feb. 3, 1987

[30] Foreign Application Priority Data

Feb. 18, 1986 [JP] Japan .................................. 61-31822

[51] Int. Cl.⁴ .............................................. H02M 1/12
[52] U.S. Cl. ...................................... 363/41; 318/811
[58] Field of Search ........................... 318/811; 363/41

[56] References Cited

U.S. PATENT DOCUMENTS

| | | | |
|---|---|---|---|
| 4,047,083 | 9/1977 | Plunkett | 363/41 |
| 4,086,623 | 4/1978 | Jensen | 363/41 |
| 4,338,558 | 7/1982 | Okamatsu et al. | 318/802 |
| 4,377,779 | 3/1983 | Plunkett | 318/811 |
| 4,409,534 | 10/1983 | Bose | 318/811 |
| 4,410,937 | 10/1983 | Uesugi | 363/132 |

OTHER PUBLICATIONS

IEEE Transactions on Industry Applications, vol. IA-21, No. 4, May/Jun. 1985, pp. 580-587.
The Transactions of the Institute of Electric Engineers of Japan (Denki-Gakkai) vol. 7, 590, 591-H. Mochikawa et al, (Technological University of Nagaoka).

Primary Examiner—Patrick R. Salce
Assistant Examiner—Jeffrey Sterrett
Attorney, Agent, or Firm—Cushman, Darby & Cushman

[57] ABSTRACT

A first memory stores first PWM control signal pattern data being calculated in advance according to the sine-triangle wave comparison modulation system in the frequency region below a predetermined frequency, for each of predetermined frequency intervals. A second memory stores second PWM control signal pattern data being calculated in advance according to the harmonic removal pattern modulation system in the frequency region above the predetermined frequency for each of predetermined frequency intervals. A frequency designating section supplies frequency designating data. A controller reads out, when receiving the frequency designating data, either the first or second PWM control signal pattern data in accordance with the frequency designating data, from the first or second memory. An inverter outputs a predetermined AC power in accordance with the read-out first or second PWM control signal pattern data. An AC motor is variably speed driven in accordance with the frequency designating data, when receiving the predetermined AC power from the inverter.

4 Claims, 4 Drawing Sheets

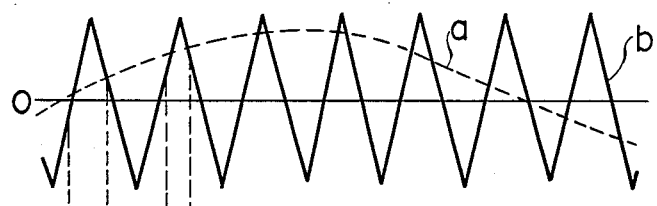
FIG. 1A
FIG. 1B
FIG. 2
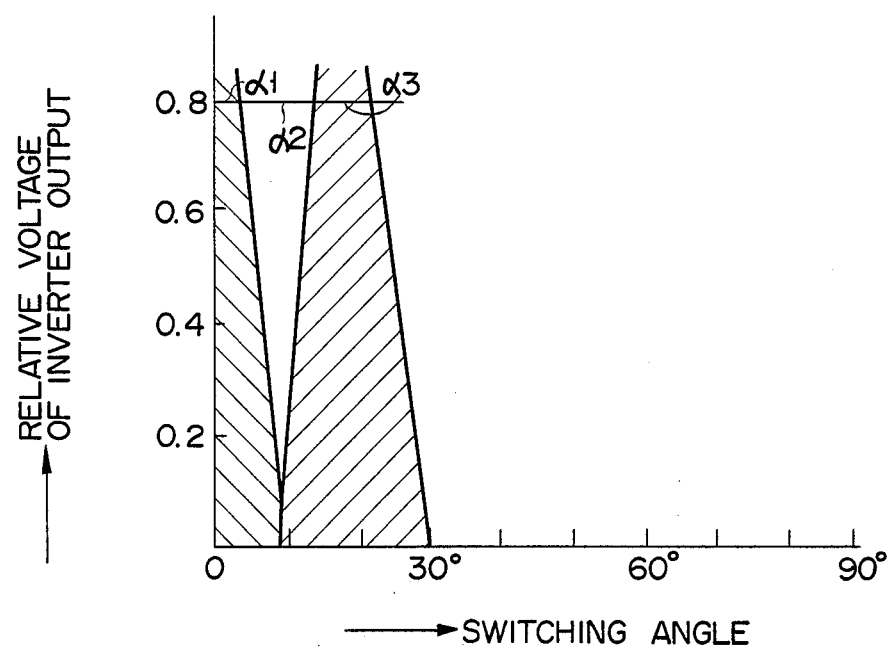
FIG. 3
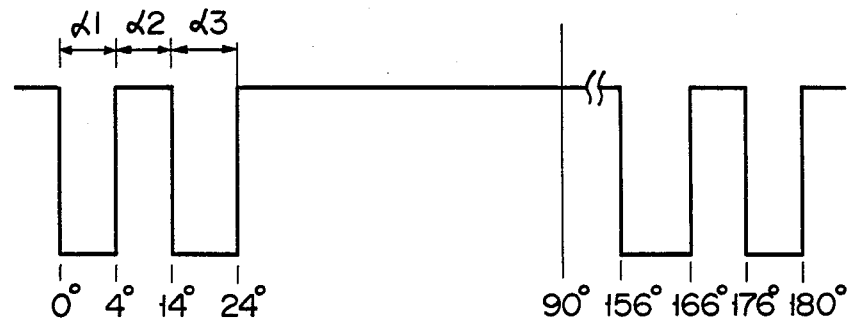

F I G. 5
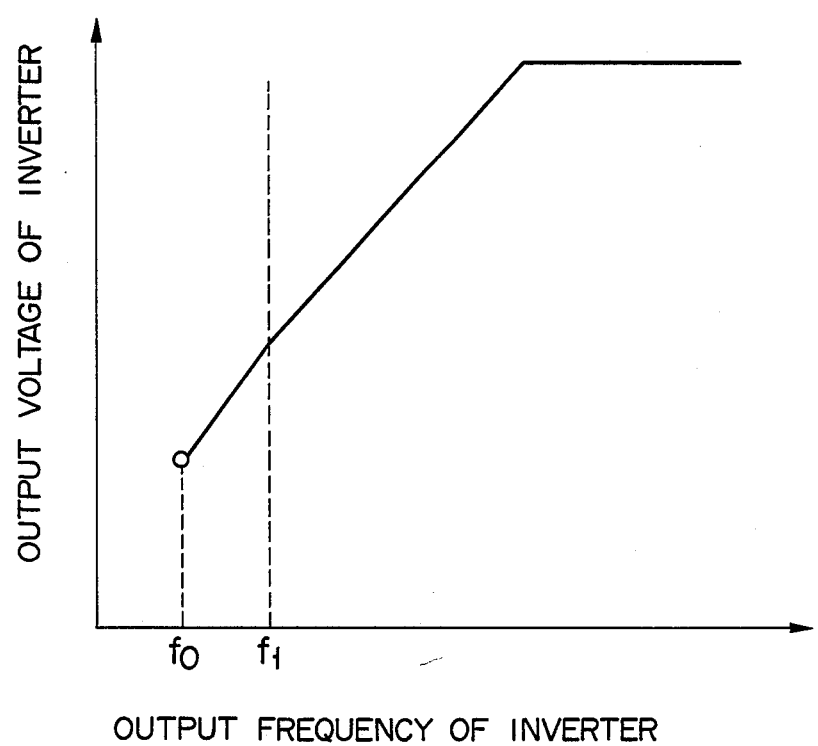

PWM INVERTER CONTROLLER FOR STARTING AND DRIVING AN AC MOTOR

BACKGROUND OF THE INVENTION

This invention relates to a method and apparatus for controlling an inverter for driving an AC motor, and more particularly to an inverter of a pulse width modulation system (PWM) for variable speed control of an induction motor.

In recent days, in small electronic appliances of the home-use type using AC motors, particularly an air conditioner which uses an induction motor for a compressor motor, there has been used an inverter of the PWM system. In this inverter, an induction motor is variably speed driven by varying the voltage-frequency characteristics of the AC power supplied to the induction motor in accordance with a variation of load. Such use of the inverter saves power consumption and realizes effective device operation.

The inverter of this type is arranged such that an appropriate number of semiconductor switching elements are connected in a bridge fashion. Each semiconductor switching element responds to a PWM control signal supplied to its control electrode and executes the DC power to AC power conversion. The converted AC power is supplied to the induction motor as a load. Since the AC power contains the voltage-frequency component dependent on the PWM control signal, the induction motor is variably speed driven.

In case of an air conditioner, for example, the PWM control signal is generated according to a frequency control command signal which is based on set temperature data and actual detected temperature data. Various types of generating systems for generating the PWM control signal have been known. The PWM control signal generating system of the prior art largely depends on the low power loss characteristic in an inverter system for variably driving the AC motor, the starting characteristic of the motor, the noise characteristic, and the like. However, none of the conventional inverter control systems have been designed on the basis of detailed and exact analysis of performance factors and correlation among these factors of the PWM control signal generating systems. Therefore, the conventional systems have many disadvantages to be solved, although, of course, there are some advantages.

In this respect, there has been a strong demand for new inverter control systems free from the above problems, in the industrial fields using various types of inverter systems.

SUMMARY OF THE INVENTION

It is, therefore, an object of this invention to provide a new and improved method for controlling an inverter for driving an AC motor, which can improve the low power loss characteristic, the starting characteristic of the motor, and the noise characteristic, to the best extent possible.

Another object of this invention is to provide a new and improved apparatus for controlling an inverter for driving an AC motor, which apparatus can smoothly drive the AC motor in a wide range from the low frequency range including the starting region to the high frequency region.

According to one aspect of this invention, there is provided a method for controlling an inverter for driving an AC motor comprising the following steps:

a frequency designating step for designating an output frequency of the inverter;

a first PWM control signal producing step for producing, when the designated frequency is lower than a predetermined frequency, a first PWM control signal to be applied to the inverter by using the sine-triangle wave comparison modulation system;

a second PWM control signal producing step for producing, when the designated frequency is higher than the predetermined frequency, a second PWM control signal to be applied to the inverter by using the harmonic removal pattern modulation system; and an inverter controlling step for controlling the inverter by the first or second PWM control signal, so that the AC motor may be variably speed driven in accordance with the designated frequency.

According to another object of this invention, there is provided an apparatus for controlling an inverter for driving an AC motor, the apparatus comprising:

first memory means for storing first PWM control signal pattern data calculated in advance according to the sine-triangle wave comparison modulation system in the frequency region below a predetermined frequency for each of predetermined frequency intervals;

second memory means for storing second PWM control signal pattern data calculated in advance according to the harmonic removal pattern modulation system in the frequency region above the predetermined frequency for each of predetermined frequency intervals;

frequency designating means for supplying frequency designating data;

read out means for reading out, when receiving the frequency designating data, either the first or second PWM control signal pattern data in accordance with the frequency designating data, from the first or second memory means;

inverter means for outputting a predetermined AC power in accordance with the read-out first or second PWM control signal pattern data; and an AC motor to be variably speed driven in accordance with the frequency designating data when receiving the prdetermined AC power from the inverter means.

BRIEF DESCRIPTION OF THE DRAWINGS

These and other objects and features of the present invention can be understood through the following embodiment be reference to the accompanying drawings, in which:

FIGS. 1A and 1B show how a PWM control signal is generated by a sine-triangle comparison modulation system, useful in explaining the fundamental idea of the present invention;

FIGS. 2 and 3 show how a PWM control signal is generated by a harmonic removal pattern modulation system;

FIGS. 5 and 6 show characteristic curves, useful in explaining the operation of the above embodiment.

DETAILED DESCRIPTION OF THE PREFERRED EMBODIMENTS

Figure 4:
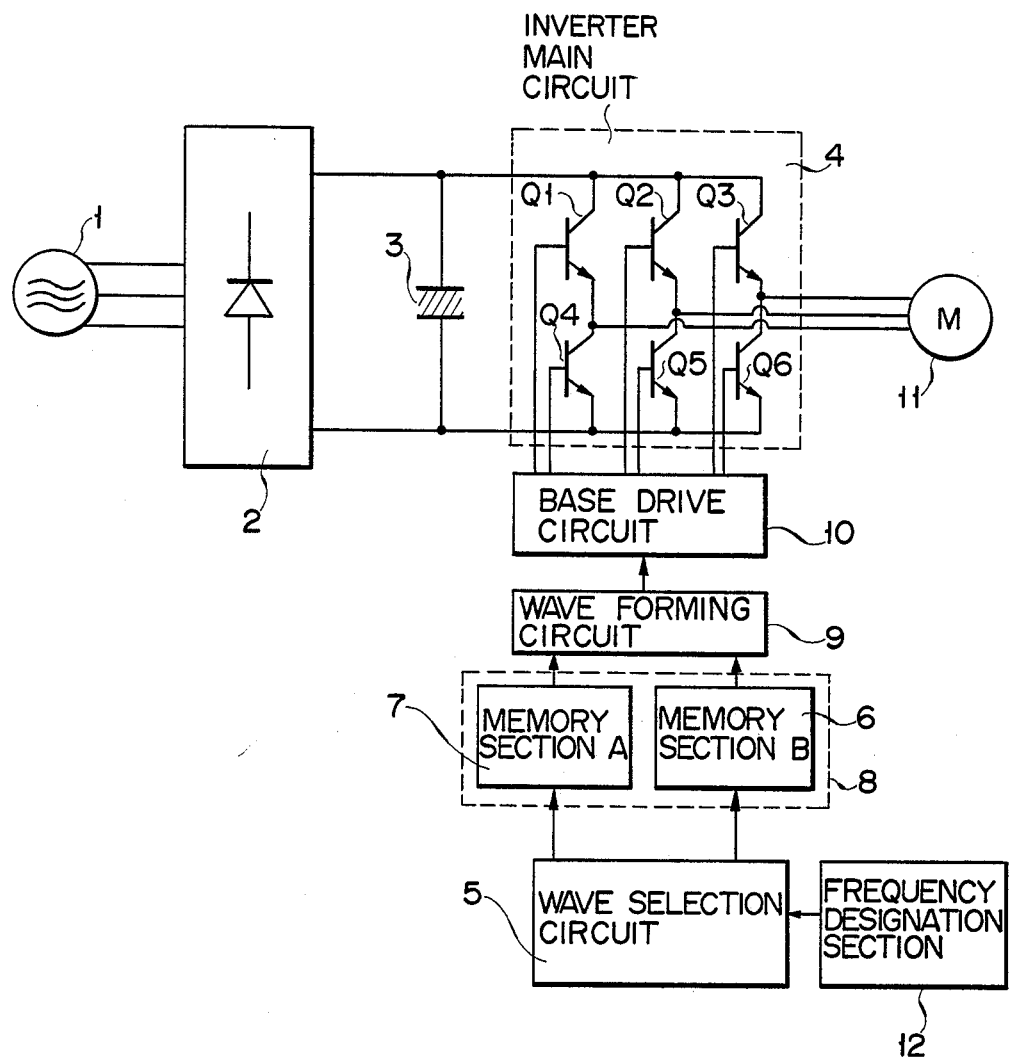
FIG. 4 shows a configuration of an embodiment according to this invention.

The basic idea of this invention will first be outlined. This invention employs a unique system for generating a PWM control signal supplied to an inverter for variably speed controlling an AC motor. In the low frequency region of the AC power output from an inverter, in which the power frequencies are lower than a predetermined frequency and a start region for the motor is contained, therein a sine-triangle wave comparison modulation system is employed. In the high frequency region whose frequencies are higher than the predetermined frequency, on the other hand a harmonic removal pattern modulation system is employed. These PWM control signal generating systems are switched between the high and low frequency regions in response to a frequency command signal.

According to this invention, satisfactory starting performance is ensured by the sine-triangle wave comparison modulation system as used for the low frequency region. The low power loss characteristic and the satisfactory noise characteristic, on the other hand, are ensured by the harmonic removal pattern modulation system. Further, use of the switching system of the present invention for these PWM control signal generating systems allows smooth control over a wide range from the low frequency region including the start region to the high frequency region. This will be discussed in detail hereinafter.

As is well known, in a sine-triangle wave comparison modulation system, a sine wave "a" at a target output frequency and a signal at triangle wave "b", as shown, are compared in magnitude to obtain a pattern "c", as shown in FIGS. 1A and 1B, respectively. A microcomputer, for example, is used for the comparing operation. This comparison modulation system generates a PWM control signal at a target output frequency which contains a predetermined number of pulses in each period.

In the PWM control signal generation system based on that modulation system, since a number of pulses are contained in one period of the target frequency, the inverter output power to be supplied to the induction motor has a wave-shape similar to a sine wave-shape. Therefore, the motor can be smoothly driven over a wide range from the low frequency region to the high frequency region. When the inverter which is controlled by the PWM control signal generated on the basis of the sine-triangle wave comparison modulation system, is applied to the drive input of a motor whose load variation is great such as a compressor motor of an air conditioner, resonance with the frequency of the carrier signal with a triangle wave occurs mainly at specific frequencies, for example, 30 to 40 Hz. This resonance causes vibration and noise. In the inverter system of the type using only the sine-triangle wave comparison modulation system for generation of the PWM control signal, the power loss also increases as the output voltage from the inverter increases.

The harmonic removal pattern modulation system now will be discussed. This system is disclosed and discussed in detail in IEEE TRANSACTIONS ON INDUSTRY APPLICATIONS, VOL. IA-21, No. 4, MAY/JUNE 1985, pp580-587, entitled "A New Control of PWM Inverter Waveform for Minimum Loss Operation of an Induction Motor Drive" by Isao Takahashi and Hiroshi Mochikawa. In this system, the harmonic loss characteristic is noted, and an optimum PWM control signal pattern is obtained through the logical operation by a microcomputer, for example. The harmonic loss removal pattern modulation system discussed in this paper will be briefly described by referring to FIGS. 2 and 3.

FIG. 2 graphically illustrates an optimum switching angle of the PWM control signal pattern as obtained by the system under discussion. In the graph, the ordinate represents a relative voltage, while the abscissa represents a switching angle. For example, for 0.8 of the relative voltage, the optimum switching angle $\alpha 1$ is 0° to 4°, $\alpha 2$ is 4° to 14°, and $\alpha 3$ is 14° to 24°. In this instance, therefore, the PWM control signal pattern is as shown in FIG. 3. In this case, the number of pulses contained in a half-period of the target output frequency is three (3). These pulses in the range from 90° to 180° are arranged symmetrically with respect to those in the range from 0° to 90°.

In this system, however, the logical operation becomes complicated as the the number of pulses contained in one period of the target frequency increases. This fact makes the increase of the number of pulses difficult for practical use. For this reason, in the PWM control signal generation system based on only the harmonic removal pattern modulation system, the waveshape of the output signal from the inverter is dissimilar to the waveshape of a sine wave. As a result, the AC motor cannot be started or operated in the low frequency region.

The system of the present invention was originally designed so as to have the optimum PWM control signal pattern, with an intention of attaining a minimum loss operation. Therefore, it has an excellent low power loss characteristic. In this system, the low power loss characteristic initially increases with an increase of the output voltage from the inverter, but it abruptly decreases when exceeding a predetermined value. Further, the inventor of this invention has confirmed that the noise characteristic of the motor is improved over that of the previously mentioned system.

An embodiment of this invention based on the above technical idea will be described by referring to FIGS. 4 to 6. In FIG. 4, three-phase AC power from three-phase AC power source 1 is rectified by rectifier circuit 2 and smoothed by capacitor 3. Rectified and smoothed DC voltage then is supplied to an inverter main circuit 4 composed of six transistors Q1 to Q6.

A frequency designating command signal for designating the output frequency of inverter main circuit 4 is produced from frequency designation section 12 and input to waveform select circuit 5. Waveform select circuit 5 checks if the frequency designated by the frequency designation signal is higher or lower than a determined frequency f1 to be given later. If it is higher than the predetermined frequency $f_1$, waveform select circuit 5 transfers a first addressing signal to memory section B6. If it is lower than that, waveform select circuit 5 transfers a second addressing signal to memory section A7. Memory section B6 stores a PWM control signal pattern as generated by the harmonic removal pattern modulation system for each predetermined interval of frequencies in the frequencies above the frequency f1 and according to the switching angle. The signal pattern is stored as binary data. Memory section A7, on the other hand, stores a PWM control signal pattern as generated by the sine-triangle wave comparison modulation system for each predetermined interval of frequencies in the frequencies lower than the frequency f1 and according to a switching angle. This signal pattern is also stored as binary data.

To be more specific, memory sections A7 and B6 can each be constructed as a read only memory (ROM) 8.

Waveform select circuit 5 consists of a circuit for issuing the appropriate addressing signals to ROM 8.

The binary data read out from memory section A7 or B6, which represents the corresponding PWM control signal pattern, is sent to waveform shape circuit 9. Wave shape circuit 9 converts the binary data into the original PWM control signal pattern and transfers it to base drive circuit 10. Base drive circuit 10 responds to the PWM control signal pattern from wave shape circuit 9, and it turns on and off transistors Q1 to Q6 in inverter main circuit 4. In this way, the AC motor 11 is variably speed driven by the AC power of the designated frequency through the turn on and off operations of these transistors Q1 to Q6.

The technique relating to storing and reading out of the binary data representing the PWM control signal pattern may be realized by the technique which is used in the invention entitled "Method of Controlling Polyphase Inverters and Control Circuits Therefor" of U.S. Pat. No. 4,410,937, and granted Oct. 18, 1983 to the same assignee as the present application.

As shown in FIG. 5, according to the above operation, in the start region ranging from an initial frequency f0 to a predetermined frequency f1, the inverter controlling apparatus drives AC motor 11 by the output of inverter main circuit 4 controlled by the PWM control signal pattern having a number of pulses generated on the basis of the sine-triangle wave comparison modulation system. In the frequency region with frequencies higher than f1, which is beyond the start region, however, the inverter controlling apparatus drives AC motor 11 by the output of inverter main circuit 4 controlled by the PWM control signal pattern as generated on the basis of the harmonic removal pattern modulation system. Thus, a motor drive with low power loss, low noise and low vibration is realized.

Figure 6:
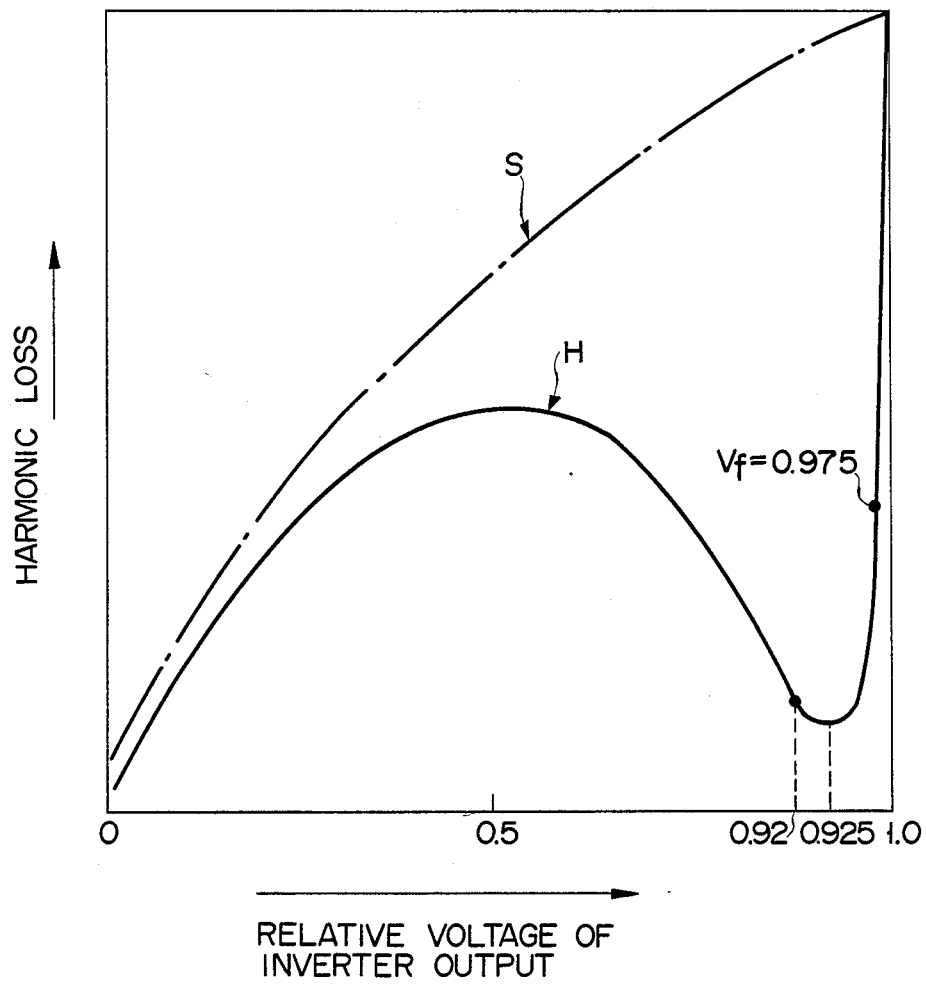

FIG. 6 shows a loss characteristic of the inverter system. In the graph, the curve S of a one-dot-chain line represents a loss characteristic when a PWM control signal generated by the sine-triangle wave comparison modulation system is used. In the same graph, curve H, a sold line, is a loss characteristic when a PWM control signal generated by the harmonic removal pattern modulation system is used.

By comparing FIGS. 5 and 6, it is understood that the output voltage from the inverter is high in the high frequency region, and that in this high frequency region the power loss characteristic is more improved by the harmonic removal pattern modulation system than by the sine-triangle comparison modulation system.

Examples of the actual value of the predetermined frequency f1 will be given. In the case of an air conditioner of 2 to 5 horsepower (HP) (variable frequency range: 15 to 90 Hz), for example f1 is about 25 Hz. In the case of an air conditioner of 1 horsepower (HP) (variable frequency range: 15 to 120 Hz), f1 is about 95 Hz. In these cases, the number of pulses of a PWM control signal in one period of the inverter output frequency is: for the former air conditioner, about 79 at 15 Hz, about 41 at 25 Hz, and about 11 to 15 at 90 Hz; and for the latter, about 119 at 15 Hz, about 17 at 95 Hz, and about 15 at 120 Hz.

The predetermined frequency f1 is usually set to be above the frequency in the start region of a motor. However, f1 may be set within a certain range, depending on the load condition, environmental condition and the tolerable loss characteristic.

As described above, according to this invention, the low loss characteristic of the power consumption and the start characteristic and the noise characteristic of the motor can be improved to the best possible values. It should be understood, however, that this invention is not limited to the above embodiment alone, but may be variously changed and modified within the scope of this invention.

What is claimed is:

1. A PWM inverter controller for starting and driving an AC motor, comprising:

PWM inverter means, responsive to a PWM control signal, for converting a DC voltage into an AC power output having a predetermined frequency;

an AC motor, responsive to said AC power output from said PWM inverter means, which is started when the predetermined frequency of said AC power output is in a starting range and which is driven at a variable-speed when the predetermined frequency of said AC power output is in a variable-speed driving range;

first storing means for storing first PWM control signal pattern data previously calculated based on a sine-triangle wave comparison modulation system over a frequency range corresponding to said starting range;

second storing means for storing second PWM control signal pattern data previously calculated based on a harmonic wave removal pattern modulation system, for predetermined frequency intervals, over a frequency range corresponding to said variable-speed driving range;

frequency designating means for selectively providing frequency designation data of the respective frequency ranges corresponding to said starting range and said variable-speed driving range;

first control means, responsive to said frequency designation data from said frequency designating means, for determining whether said frequency designation data is in said frequency range corresponding to said starting range or said frequency range corresponding to said variable-speed driving range, and for selecting said first storing means when said frequency range is determined to correspond to said starting range and for selecting said second storing means when said frequency range is determined to correspond to said variable-speed driving range, to thereby read out said first or second PWM control signal pattern data from said respective first or second storing means according to said frequency designation data; and second control means, responsive to said first or said second PWM control signal pattern data read by said first control means, for converting said first or said second PWM control signal pattern into a corresponding PWM control signal and for supplying it as an input to said PWM inverter means.

2. The PWM inverter controller according to claim 1, wherein said AC motor is of an induction type and is used as a compressor motor for an air conditioner controlled by said PWM inverter means.

3. The PWM inverter controller according to claim 1, wherein said PWM inverter means includes an inverter main circuit having a plurality of transistors in a bridge configuration.

4. The PWM inverter controller according to claim 3, wherein said second control means includes a base drive circuit for driving said plurality of transistors in said inverter main circuit, in an ON/OFF fashion, in accordance with said PWM control signal.

* * * * *